United States Patent [19]

Grigoletto

[11] Patent Number: 4,716,946
[45] Date of Patent: Jan. 5, 1988

[54] CRYOGENIC FLUID TRANSFERRING DEVICE

[75] Inventor: Philippe Grigoletto, Villeparis, France

[73] Assignee: L'Air Liquide, Societe Anonyme pour l'Etude et l'Exploitation des Procedes Georges Claude, Paris, France

[21] Appl. No.: 920,053

[22] Filed: Oct. 20, 1986

[30] Foreign Application Priority Data

Oct. 18, 1985 [FR] France ................................ 85 15460

[51] Int. Cl.$^4$ .............................................. B65B 3/04
[52] U.S. Cl. .................................... 141/269; 141/281; 141/346; 62/55
[58] Field of Search ........................................ 62/50–55; 141/346, 347, 348, 349, 232, 98, 250–284

[56] References Cited

U.S. PATENT DOCUMENTS 4,298,040 11/1981 Pohan ................................... 141/346
4,576,218 3/1986 Artz et al. ............................ 141/232

FOREIGN PATENT DOCUMENTS 584524 2/1925 France .
2063957 7/1971 France .

Primary Examiner—Houston S. Bell, Jr.
Attorney, Agent, or Firm—Young & Thompson

[57] ABSTRACT

The two end members (1, 4) are locked by a self-retractable hook (15) which engages in a groove (23) in the female end member (1). The hook (15) is connected to an actuating lever (11) biased by a spring (14) and provided with a push-button (20). Pivotally mounted on the other arm of the lever (11) is a yoke (6) mounted on the male end member (4). When the transfer has finished, the hook (15) is retracted by depressing the button (20) so as to unlock the coupling. In the event of frosting, by depressing the button (20) still further, the yoke (6) upwardly urges the female member (1) and separates the two end members. Application in the transfer of liquid oxygen from a storage container to a portable container for domestic oxygen treatment.

11 Claims, 3 Drawing Figures

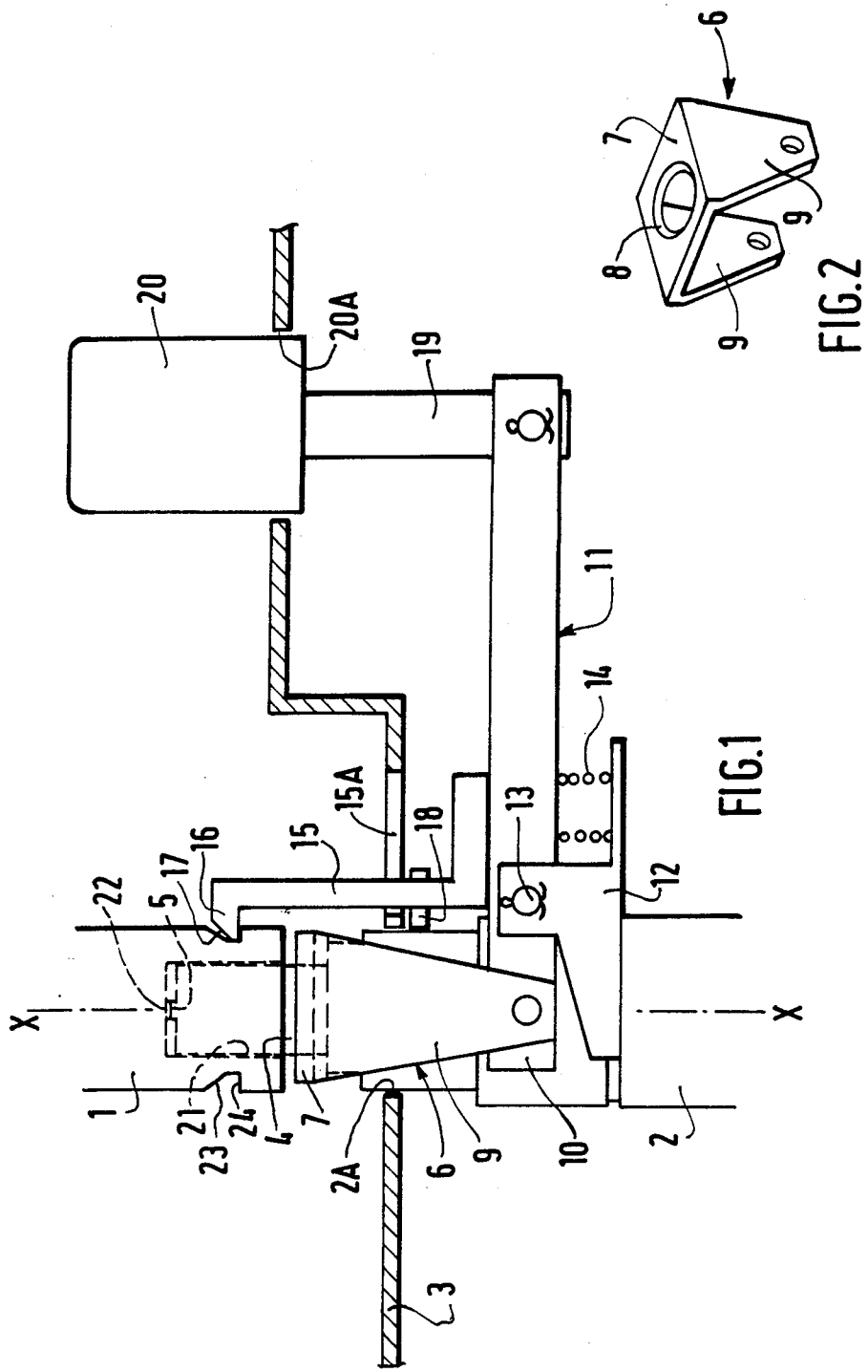

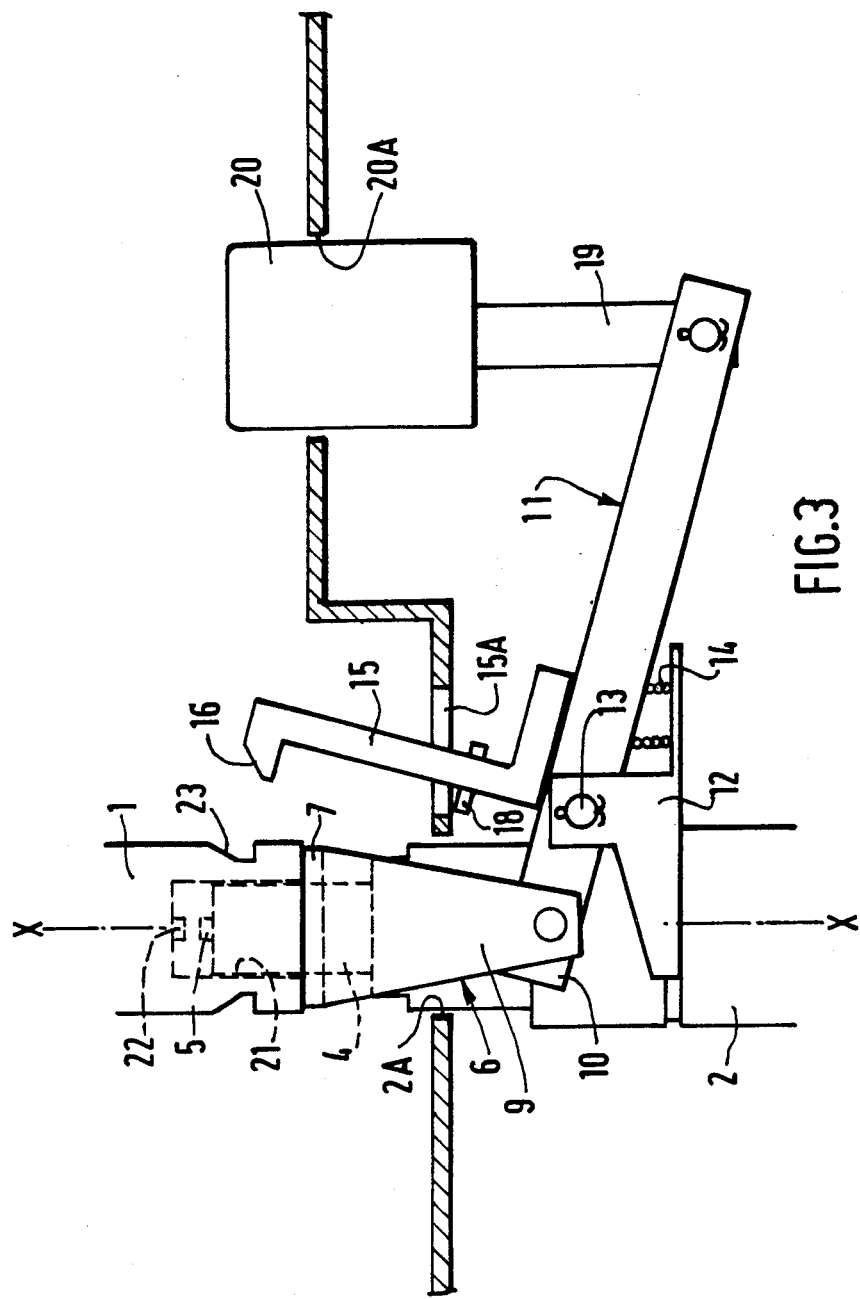

CRYOGENIC FLUID TRANSFERRING DEVICE

The present invention relates to a device for transferring a cryogenic fluid, of the type comprising two end members which are each part of a container and cooperate by a simple pushing in. It is in particular applicable to the transfer of liquid oxygen from a storage container to a portable container of a domestic oxygen treatment system.

Many systems have been developed for treating respiratory insufficiencies at home. They comprise a storage container (containing for example 20 to 40 liters of liquid oxygen) having an autonomy of one to two weeks, and a portable container (containing for example 0.6 to 1.3 liters of liquid oxygen) having an autonomy of several hours. The two containers are provided with filling end members. The portable container is filled by the storage container by a coupling of the male end member with the female end member and putting the portable container in communication with the air. Each end member includes a valve head provided with a return spring for biasing the valve to the closing position. These valves are opened either by means of lugs provided on the male end member which are locked on the female end member (bayonet couplings), or merely by directly pushing one end member against the other during the filling.

The filling process employing a bayonet coupling has the advantage of requiring only a small locking force, but has two drawbacks:

the face-to-face positioning of the male and female end members is delicate to achieve;

in the event of a jamming of the coupling due to frosting of the members, the user must wait until they rise in temperature (5 to 15 minutes) before they can be disconnected, or risk damaging the end members by forcing them apart.

The filling process employing a mere pushing of the male member into the female member is easier to use; however, it requires a greater force to be exerted throughout the filling period owing to the absence of a locking. Further, there is also the problem of the jamming of the coupling by a frosting of the members.

An object of the invention is to provide a transferring device employing a simple pushing of one of the end members into the other which permits both avoiding the maintenance of the thrust during the transfer and ensuring in every case a reliable and easy separation of the two end members when the transfer has finished.

The invention therefore provides a transferring device of the aformentioned type which comprises an element for separating the two end members combined with an element for locking the coupling of the two end members so that, when the locking element is in an operative position, the separating element is retracted and vice versa, and a common mechanism for actuating the separating element and the locking element.

In a particularly simple embodiment, the actuating mechanism comprises a lever which carries the locking element on one side of its pivot axis, the separating element being pivotally mounted on the part of this lever on the opposite side of this axis.

Preferably, the lever is resiliently biased toward the active position of the locking element, the latter having a cam surface adapted to cooperate with the end of the associated end member during the coupling of the two end members.

An embodiment of the invention will now be described with reference to the accompanying drawings, in which:

FIG. 1 is a diagrammatic side elevational view of a transferring device according to the invention in the locked position;

FIG. 2 is a perspective view of a component part of this device, and

FIG. 3 is a view similar to FIG. 1 illustrating the separation of the two end members.

There has been partly shown in FIG. 1 the upper part of a liquid oxygen storage container having a capacity of 20 to 40 liters, and the coupling end member 1 of a portable liquid oxygen container having a capacity of 0.6 to 1.3 liters, the assembly being part of a domestic oxygen treatment system.

As concerns the present invention, the storage container comprises essentially an outlet nozzle 2 which has a vertical axis X—X and extends through an opening 2A provided in the upper wall 3 of the case of the container. This nozzle 2 terminates above the wall 3 in a cylindrical male end member 4 having a projecting valve head 5 which is biased toward its outer closing position by a spring (not shown).

Freely mounted on the end member 4 is a separating yoke 6. As can be seen in FIG. 2, this yoke has an upper plate 7 provided with a circular aperture 8 whose diameter is slightly larger than that of the end member 4 which extends through this aperture, and two lateral depending wings 9. The lower end portions of the two wings 9 are respectively pivotally mounted on the two branches of a fork 10 provided at the end of an actuating lever 11 and extending on both sides of the nozzle 2.

Fixed to the nozzle 2 is a plate 12 which carries a pivot pin 13 for the lever 11. On the opposite side of the pivot pin 13 to the fork 10 is a compression spring 14 interposed between the plate 12 and the lever 11. Fixed on the upper side of the lever is a locking hook 15 which projects from the wall 3 by extending through a slot 15A in this wall and terminates above the plate 7 in a nose portion 16 which defines at its free end an inclined upper cam surface 17. Inside the case, the hook 15 is provided with an adjustable stop 18. When the end members 1 and 4 are not engaged with each other, this stop maintains the lever 11 in a roughly horizontal position and the hook 15 in a roughly vertical position, with the lower side of the nose portion 16 roughly horizontal. Pivotally mounted on the end portion of the lever 11 opposed to the yoke 6 is a rod 19 which carries a pushbutton 20 guided in an opening 20A in the wall 3 through which it extends. The end member 1 is a cylindrical female member having a blind bore 21 which corresponds to the end member 4 and has an inner end which is provided with a valve head 22 biased by a spring (not shown) to its closing outer position. Further, a circular groove 23 is provided on the outer surface of the end member 1 close to its lower end and has a lower surface 24 perpendicular to the axis of this end member.

To transfer liquid oxygen from the storage container into the portable container, the end member 1 is brought over the end member 4 and is lowered along the axis X—X at any angular orientation. The bore 21 is placed on the end member 4; the end edge of the end member comes into contact with the cam surface 17 of the hook 15 and urges the latter back in opposition to the action of the spring 14, then the nose portion 16 clips into the groove 23 under the action of this spring. The two valve heads 15 and 22 are then depressed and opened, which allows the transfer of the liquid oxygen and their springs exert a force which tends to separate the two end members. The assembly is therefore firmly locked by the hook 15 and the user can let go of the portable container with no risk of the transfer of liquid oxygen ceasing. In this position, shown in FIG. 1, the lower end surface of the end member 1 is at a short distance above the plate 7 of the yoke 6.

When the transfer of liquid oxygen has finished, the user depresses the button 20 and thus causes the lever 11 to pivot in the clockwise direction (as viewed in FIGS. 1 and 2) in opposition to the action of the spring 14. This first of all causes the nose portion 16 to leave the groove 23 and consequently unlock the coupling of the two end members.

In the absence of frosting, the two end members are then separated without difficulty merely by raising the portable container, the separation being initiated by the force exerted by return springs of the two valve heads 5 and 22. On the other hand, if a frosting has occurred which jams the separation of the two end members, it is sufficient to depress the buttom 20 still further. The plate 7 of the yoke 6 then comes into contact with the lower end surface of the end member 1 and easily urges the latter upwardly with a force multiplied by the difference in the lengths of the two arms of the lever 11. The position illustrated in FIG. 3 is thus reached and the portable container can then be lifted off the storage container without difficulty.

What is claimed is:

1. A device for transferring a cryogenic fluid comprising two end members each being a part of a respective container and the end members being cooperative by a simple pushing of one end member into the other end member, a locking element having an active position for locking together the two end members and an unlocking position for releasing the two end members from each other, an element for separating from each other the two end members combined with the locking element so that, when the locking element is in said active position, the separating element is retracted and when the locking element is in said unlocking position the separating element is active for separating the two end members, and a common mechanism for actuating the separating element and the locking element.

2. A device according to claim 1, wherein the separating element is adapted to slide along a first of said end members and to bear against an end surface of a second of said end members when it is shifted to an active position.

3. A device according to claim 2, wherein the separating element comprises an apertured plate placed on said first end member.

4. A device according to claim 1, wherein the locking element comprises a hook carried by one of the containers and engageable with a peripheral recess in the end member of the other container.

5. A device according to claim 4, wherein said recess is a circular groove.

6. A device according to claim 4, wherein the actuating mechanism comprises a lever which is pivotable about a pivot axis and carries the locking element in a part of the lever on one side of said pivot axis, the separating element being pivotally mounted on a part of the lever located on a side of said axis opposed to said one side.

7. A device according to claim 6, wherein the lever carries a push-button adjacent to an end of the lever opposed to the separating element.

8. A device according to claim 6, comprising means for resiliently biasing the lever toward a position corresponding to the active position of the locking element, the locking element having a cam surface adapted to cooperate with an end portion of said second end member during the coupling of the two end members.

9. A device according to claim 8, wherein the locking element carries a stop adapted to bear against said first end member when the two end members are separated from each other.

10. A device according to claim 1, wherein the mechanism is adapted to shift the locking element to said unlocking position thereof before the separating element exerts a thrust tending to separate the two end elements from each other.

11. A device for transferring a cryogenic fluid from a first container to a second container, the device comprising: two mating tubular end members each being a part of a respective container and communicating with an interior space of the respective container, the end members being cooperative for transferring said fluid by a simple pushing of one end member into the other end member; a locking element having an active position for locking the two end members in a coupled position and an unlocking position for releasing the two end members from each other; a separating element for separating the two end members from each other, the separating element being combined with the locking element so that when the locking element is in said active position, the separating element is in a retracted position and when the locking element is in said unlocking position the separating element is active for separating the two end members from each other; and a common mechanism for actuating the separating element and the locking element.

* * * * *